FM-FM AUDIO MULTIPLEX TELEVISION BROADCASTING SYSTEM WITH REDUCTION OF UNDESIRED PHASE MODULATION COMPONENT

BACKGROUND OF THE INVENTION

This invention relates to FM—FM radio multiplex television systems and, more particularly, to a carrier compensating system for compensating the video carrier for the phase modulation accompanying the video carrier amplitude modulation with the video signal.

The FM—FM audio multiplex television broadcasting system herein refers to a television system utilizing a well-known FM—FM system, which is employed in transmitting multiplex message, for instance bilingual signals or stereophonic signals, and in which one of the two sound signals to be superimposed is used for frequency modulation on a subcarrier at double the frequency of the horizontal synchronizing signal and the frequency-modulated subcarrier is combined with the other audio signal for frequency modulation of the main carrier.

In the usual television broadcasting system, the phase modulation accompanying the amplitude modulation of the video carrier gives rise to buzz which degrades the sound quality if the television receiving set adopts the intercarrier system. The vertical and horizontal components mainly affect the buzz component.

In the FM—FM audio multiplex television broadcasting system using an audio subcarrier, the sound signal seriously suffers from undesired disturbing signals particularly due to the horizontal synchronizing component because of the fact that in such system the audio signal modulation is used for frequency modulation on a subcarrier, whose frequency has a predetermined bearing upon the frequency of the horizontal synchronizing signal. The introduction of a great buzz component into the sound in such system greatly degrades the sound quality.

SUMMARY OF THE INVENTION

An object of the invention is to provide an FM—FM audio multiplex television broadcasting system, in which the video carrier is previously phase modulated prior to the picture signal modulation by utilizing the variation of the electrostatic capacitance of a varactor diode with the video signal such that the component of the phase modulation accompanying the video carrier amplitude modulation is canceled.

DETAILED DESCRIPTION OF THE PREFERRED EMBODIMENTS

Figure 1:
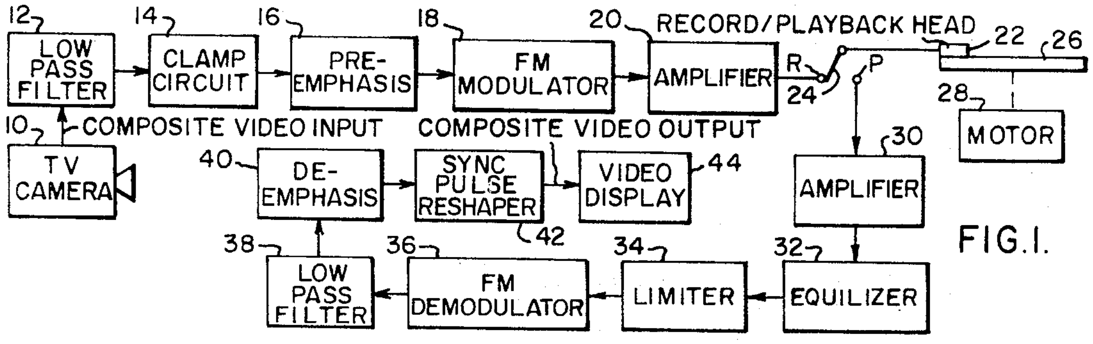
FIG. 1 is a block diagram of an embodiment of the FM—FM audio multiplex television broadcasting system according to the invention.

Referring now to FIG. 1, which illustrates an FM—FM audio multiplex television broadcasting system embodying the invention, a video carrier oscillator 11 feeds a video carrier through a phase control circuit generally designated at 12 to a video modulator 13. The video carrier entering the phase control 12 passes through a circulator 14 to reach a phase controller 15, where it is reflected back to the circulator 14, and then it is led through high-frequency amplifier 16 to the video modulator 13. The phase controller 15 is shown in detail in FIG. 2. It is comprised of a series circuit of a coil 31 to receive the output from the circulator 14 and a varactor diode 32 having its anode connected to the coil 31.

Figure 2:
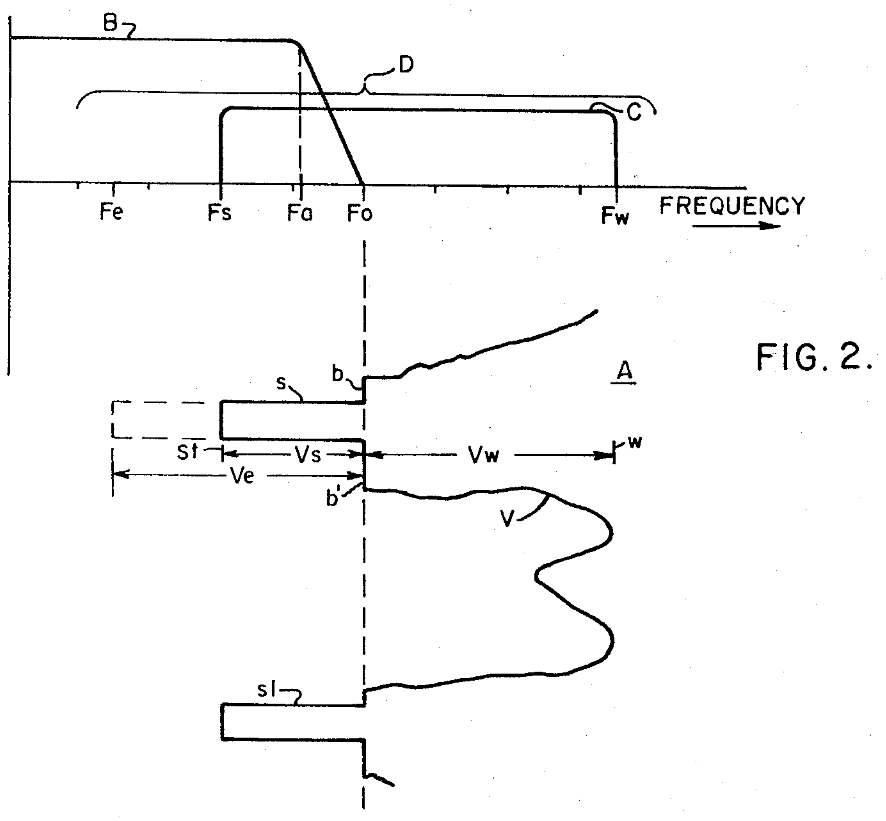
FIG. 2 is a circuit diagram of the phase controller in the embodiment of FIG. 1.

The video signal coming from picture input unit (not shown) and entering the phase control circuit 12 encounters a branching point, as shown in FIG. 1, from which a branch leads through a broad band amplifier 17 to the cathode of the varactor diode 32 in the phase controller proper 15, as shown in FIG. 2. The electrostatic capacitance of the varactor diode 32 varies in accordance with the voltage of the picture signal impressed thereon so as to vary the reactance for the series circuit 15 consisting of the coil 31 and the varactor diode 32, so that the video carrier wave incident on the phase controller 15 undergoes a phase shift in a direction to counter or cancel the component of phase modulation involved when the reflected video carrier is later amplitude-modulated with the video signal to be described hereinafter.

Another branch leads from the aforementioned branching point through a delay line 18 to the video modulator 13. The phase-compensated video carrier fed to the video modulator 13 is amplitude-modulated therein with the video signal entering there through the delay line 18 of the phase control circuit 12. The video signal entering the video modulator 13 is delayed a predetermined time by the delay line 18 such that the phase modulation introduced into the video carrier by the phase controller 15 is timed to offset the phase modulation accompanying the amplitude modulation of the video carrier with the video signal. The phase modulation component produced at the time of the amplitude modulation by the video modulator 13 is canceled, and the output from the video modulator is free from the phase modulation component. The amplitude-modulated output signal from the video modulator 13 is amplified by an amplifier 19 and then fed to a diplexer 20.

The video multiplex signal containing the main channel and subchannel signal components, which is synthesized by a video multiplex unit 21, is amplified by an audio transmitter 22 and then fed to the diplexer 20. The diplexer 20 receiving the video AM signal and the audio FM signal feeds its output from its output terminal to a transmitting antenna 23.

As is described, according to the foregoing embodiment shown in FIGS. 1 and 2 a video AM signal with a reduced phase modulation component stemming from the amplitude modulation of the video carrier may be made available by phase controlling the video carrier through the variable electrostatic capacitance of the varactor diode 32 in accordance with the video signal prior to the amplitude modulation by the video modulator 13, so that the undesired disturbing signal such as buzz due to the phase modulation component contained in the video AM signal is greatly reduced when reproducing an audio multiplex signal with the intercarrier type television receiving set. Thus, excellent quality of the reproduced multiplex sound may be ensured.

Figure 3:
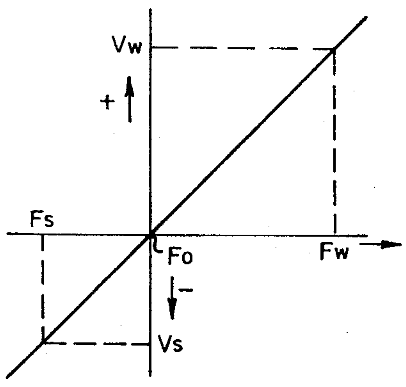
FIG. 3 is a block diagram of another embodiment of the FM—FM audio multiplex television broadcasting system according to the invention.

FIG. 3 shows another embodiment of the invention. In this embodiment, another delay line 41 is inserted between the aforementioned branching point and the broad-band amplifier 17 in the previous embodiment. Similar to the previous embodiment, the video signal entering the video modulator 13 is delayed a predetermined period of time, which is in this embodiment determined by the delay lines 18 and 41, such that the phase modulation introduced into the video carrier is timed to off-set the phase modulation accompanying the amplitude modulation in the video modulator 13.

As has been described in the foregoing, according to the invention it is possible to provide an FM—FM audio multiplex television system, which permits extracting a high-quality video multiplex signal with reduced disturbing signal component with the intercarrier type television receiving set.

What we claimed is:

1. An FM—FM audio multiplex television broadcasting system comprising:
   - means to produce an FM—FM audio multiplex signal,
   - means to modulate a video signal to produce an amplitude-modulated video signal, said modulating means including:
     - an oscillator to produce a video carrier;
     - a phase control circuit, including a passive element, responsive to the video signal to control the phase of said video carrier, prior to the amplitude-modulation,

United States Patent

Kennedy et al.

[15] 3,659,042

[45] Apr. 25, 1972

[54] WIDE DEVIATION MAGNETIC RECORDING TECHNIQUES

[72] Inventors: Paul G. Kennedy, Monroeville; Raymond W. Mackenzie, Pittsburgh, both of Pa.

[73] Assignee: Westinghouse Electric Corporation, Pittsburgh, Pa.

[22] Filed: Oct. 6, 1969

[21] Appl. No.: 863,831

[52] U.S. Cl. .......................................................... 178/6.6 A

[51] Int. Cl. .......................................... H04n 5/62, H04n 5/68

[58] Field of Search .................................. 178/6.6 A, DIG. 3

[56] References Cited

UNITED STATES PATENTS 3,188,615 6/1965 Wilcox ................................ 178/6.6 A 3,350,504 10/1967 Takayanagi ......................... 178/6.6 A

*Primary Examiner*—Bernard Konick

*Assistant Examiner*—Steven B. Pokotilow

*Attorney*—F. H. Henson, C. F. Renz and A. S. Oddi

[57] ABSTRACT

A method and apparatus for recording on recording media, having a predetermined bandwidth, composite video signals including video, blanking and synchronizing portions and having a predetermined frequency spectrum wherein the composite video signals are frequency modulated on a carrier frequency which has a value near to the upper frequency limit of the predetermined frequency spectrum so that the blanking portion of the composite video signal produces the carrier frequency, modulated signals of frequencies lower than the carrier frequency extending into the predetermined frequency spectrum are produced in response to the synchronizing portion and modulated signals having frequencies higher than the carrier frequency are produced in response to the video portion, with the maximum deviation of the carrier frequency being greater than the predetermined frequency spectrum.

8 Claims, 3 Drawing Figures

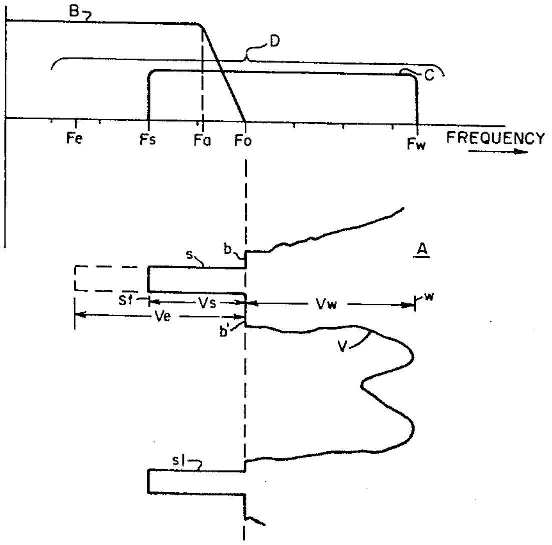

INVENTORS
Paul G. Kennedy &
Raymond W. Mackenzie
BY [signature]
ATTORNEY

WIDE DEVIATION MAGNETIC RECORDING TECHNIQUES

BACKGROUND OF THE INVENTION

1. Field of the Invention

The present invention relates to methods and apparatus for recording and reproducing wide frequency spectrum signals and, more particularly, to such methods and apparatus for recording and reproducing composite video signals with media.

2. Discussion of the Prior Art

Recording wideband video signals, such as standard television signals, on magnetic recording media, such as, tapes, drums, or discs, requires special recording techniques due to the wide frequency spectrum of the video signals. For example, a bandwidth of approximately 4 MHz. is required for recording monochrome television. One technique for recording is shown in U.S. Pat. No. 2,956,114, wherein the video signals are modulated on a carrier frequency which is selected to have a value near the upper frequency limit of the recording media and the maximum deviation of the carrier frequency is small relative to the maximum frequency of the frequency spectrum of the video signals. By selecting the carrier frequency to be near the upper frequency limit of the bandpass of the recording media, the deviation must be kept small in order to prevent the high frequency deviation from exceeding the bandpass limit of the recording media which would adversely affect the quality of video reproduction. Hence, a limited bandwidth is provided for the modulation of the composite video signal, including synchronizing and video components, onto the carrier frequency selected to be near the upper frequency limit of the recording media. The bandwidth available for deviation is further limited for the video portion of the composite video signals due to the fact that approximately 30% of the peak-to-peak amplitude of the composite video from sync tip level to maximum white level is taken by the synchronizing portion of the composite video waveform. This leaves only approximately 70% of the deviation for the video portion of the waveform from the blanking level to the maximum white level which contains the desired video information for reproduction. As is well known, the signal-to-noise ratio of a channel is improved by increasing the deviation of the carrier frequency to accommodate the bandwidth of that channel. By selecting the carrier frequency to be near the upper frequency limit of the bandwidth of the recording media and so limiting the deviation of the carrier frequency, the signal-to-noise ratio will be affected which may deteriorate the quality of video reproduction. Moreover, if the maximum deviation of the carrier frequency is increased so that the video portions of the composite video signal extend lower in frequency into the frequency spectrum of the composite video signal cross modulation products can be generated thereby, which may cause beat patterns to be produced on reproduction of such a recording. It would thus be highly desirable if a recording technique were provided wherein the deviation of the carrier frequency is made as high as possible and yet avoid seriously lowering the signal-to-noise ratio of the recording channel and which moreover does not produce visible beat patterns upon the reproduction of the recorded video information.

SUMMARY OF THE INVENTION

Broadly, the present invention provides a method and apparatus for recording on recording media composite video signals wherein the blanking portion of the composite video signals is selected to be near the upper frequency limit of the frequency spectrum of the composite video signals and the video portion is thereby permitted to deviate widely within the bandwidth of the recording media while the synchronizing portions may cause deviations which extend into the frequency spectrum of the composite video but do not affect the quality of the reproduction of the video information.

BRIEF DESCRIPTION OF THE DRAWING

FIG. 1 is a schematic-block diagram showing the implementation of the present invention;

FIG. 2 is a plot of the amplitude versus frequency characteristics of the present invention; and FIG. 3 is an amplitude versus frequency plot utilized in explaining the operation of the present invention.

DESCRIPTION OF THE PREFERRED EMBODIMENT

Referring now to FIGS. 1 and 2, FIG. 1 shows an implementation of the apparatus of the present invention wherein the method of the present invention may be practiced. A television camera 10 is provided which may comprise a standard television camera which supplies a composite video signal in response to a scene being scanned at desired horizontal line and vertical field rates. A composite video signal is shown in curve A of FIG. 2. The illustrated waveform a includes a synchronizing portion *s*, a blanking portion *b* and a video portion *v*. The waveform as illustrated is intended to represent a standard composite video waveform as required by Federal Communications Commission standards. In the standard waveform the synchronizing portion of the waveform covers approximately 30% of the total peak-to-peak value of the waveform. In curve A, the sync tip level, that is, the maximum amplitude of the sync portion *s*, is defined at the level *st*. The sync portion *s* extends from the sync tip level *st* to the blanking level *b*, which is at a blacker than black level, where the electron beam of the cathode ray tube for reproduction would be blanked off. The video portion *v* extends from the blanking level *b* and changes from black through the shades of grey to white as the intensity of the video portion increases, reaching maximum light intensity at the level *w* as indicated on curve A.

The waveform A illustrates one horizontal line of scan between the sync pulse *s* and the subsequent sync pulse *sl* for the next line of scan. Only the video waveform for horizontal lines of scan have been shown in curve A to demonstrate the operation of the present invention. A composite video waveform including a vertical synchronizing pulse indicating the end of a vertical field of scan has not been shown since the operation of the present invention is identical as for the case illustrated in curve A of FIG. 2.

The composite video output being supplied from a television camera, such as the camera 10 in FIG. 1, has only been shown as being exemplary. Composite video signals could be obtained from any suitable source such as a standard television receiver receiving off-the-air signals wherein the composite video is taken after the video detection stages thereof or alternately could be taken from pre-recorded video signals on video recording apparatus such as a video tape recorder or magnetic disc or drum recording apparatus.

In the present example, the composite video output from the television camera 10 is applied to a low pass filter 12 which has a response characteristic such as shown in curve B of FIG. 2. Curve B shows the low pass filter 12 to have a bandpass extending from substantially zero frequency, which may be in actuality approximately 100 Hz., for example, with a substantially flat characteristic until the limits of the bandpass are reached, with the three db attenuation frequency being indicated as F*b*. The frequency response rapidly decreases from F*b* to the upper cutoff frequency limit indicated as F*o*, which may be 100 db or more down from the bandpass response. In a practical implementation of the present system the upper bandpass frequency F*b* would be selected at approximately 4.1 MHz. and the upper cutoff frequency F*o* would be at approximately 5 MHz.

The low pass filter 12 thus defines the bandwidth of the composite video input which will be translated therethrough substantially attenuating frequencies above the 3 db frequency F*b*. The low pass filter 12 eliminates high frequency noise from being introduced into the recording channel and provides for better quality of recorded signals for reproduction.

The composite video signals at the output of the low pass filter 12 are applied to a clamp circuit 14. The function of the clamp circuit 14 is to clamp a selected portion of the composite video waveform, such as shown in curve A of FIG. 2, to a predetermined reference voltage. In the present system, the selected portion of the composite video waveform is the blanking portion *b*, typically the so-called back-porch portion *b'* appearing after the sync pulse *s*. If desired, the so-called front porch portion, may be utilized. The reference potential may be selected to be zero or ground potential, for example. By so clamping the blanking portion *b* to zero potential, the video portions *v* of the composite waveform will extend, for example positively in voltage therefrom and the synchronizing portion *s* will extend negatively therefrom. Hence, the maximum positive excursion of the waveform of curve A will be to the maximum white level *w* and the maximum negative excursion of the sync pulse *s* will be to the sync tip level *st*.

The operation of the clamp circuit 14 is to be distinguished from AC coupling the composite video signal into the recording channel since with AC coupling the zero or ground reference level would be at the level where there would be equal integrals above and below the zero axis for the waveform. Thus, the voltage level of the blanking level *b* of the composite video waveform would vary according to the video content of the video portion *v* of the waveform. For example, if the video information were primarily white the blanking level would be at a lower negative potential than if the video information were primarily black. In the present invention, however, the blanking level *b* of the composite video waveform is always clamped to a reference potential which is conveniently selected to be at a zero voltage level and will be so considered for purposes of explanation herein.

The clamped composite video waveform from the clamp circuit 14 is applied to a pre-emphasis circuit 16 whose function is to process the clamped composite video waveform prior to recording. Herein the pre-emphasis 16 is utilized to increase the amplitude of the signals applied thereto at the upper frequency levels of the video bandpass as compared to the middle and lower frequencies. This compensation is required in order to enhance the high frequency response of the recording channel, which, if not done, could permit fixed noise patterns to be reproduced upon playback of the recorded signals.

The output of the pre-emphasis 16 is applied to an FM modulator 18 which may comprise a standard FM modulator wherein a carrier or reference frequency, designated herein $F_o$, is modulated in frequency according to the magnitude of the input signal applied thereto. Thus, the carrier frequency $F_o$ is outputted from the FM modulator 18 in response to a zero or reference input level being applied thereto, and frequencies above and below the carrier frequency are outputted in response to signals of positive and negative polarities, respectively, being inputted thereto, for example.

As previously explained the blanking portion *b* of the composite video waveform A of FIG. 2 is clamped to the zero or ground reference level and hence the carrier frequency $F_o$ is outputted by the FM modulator 18 in response to the blanking level *b* of the video waveform A. As can be seen by the curves of FIG. 2, in response to the video portion *v*, the output of the FM modulator 18 deviates to higher frequencies according to the amplitude thereof, with the maximum positive deviation occurring to the frequency $F_w$ which is at the maximum white level *w* for the video portion *v*. The sync portion s causes deviation to lower frequencies than the carrier frequency $F_o$ with the sync tip portion st causing the maximum low frequency deviation to the frequency $F_s$ as indicated in FIG. 2. The maximum frequency deviation in response to the input composite video signal clamped to the blanking level *b* is thus the deviation $F_w - F_s$.

FIG. 3 shows the plot of the input voltage to the FM modulator 18 as a function of the output frequency thereof. Thus, for an input at the maximum white level voltage $V_w$, an output frequency of $F_w$ higher than the carrier frequency $F_o$ will be provided. In response to the sync tip voltage $V_s$, an output frequency $F_s$ lower than the carrier frequency $F_o$ is provided. Various amplitudes of video information between the maximum limits will provide respective frequency deviations within the maximum deviations described.

Curve C of FIG. 2 shows the frequency spectrum for the deviation of the carrier frequency $F_o$ between the maximum deviation limits of $F_w$ and $F_s$. It should be particularly noted that the carrier frequency $F_o$ corresponds to the cutoff frequency $F_o$ for the low pass filter 12 as shown in curve B. In a practical embodiment the frequency $F_o$, as previously given, may be approximately 5 MHz. The maximum deviation in the upper direction for the frequency $F_w$ may be selected at approximately 8.5 MHz. and the lower frequency $F_s$ at approximately 3 MHz. The maximum deviation for these values would be 5.5 MHz., which is considerably greater than the frequency spectrum of the composite video signal as defined by the response Curve B for the low pass filter 12 having approximately a 4.1 MHz. bandpass $F_a$.

By selecting the maximum deviation $F_w - F_s$ to be greater than the bandpass $F_a$ for the video information, it might be thought that cross modulation products between the frequency modulated signals appearing within the bandpass of the composite video signals would adversely affect the reproduction of recorded video information and cause beat frequency patterns to be reproduced on the display when the recorded video information is extracted. However, this is not the case according to the method and apparatus of the present invention due to the unique selection of the carrier frequency $F_o$ to be near the cutoff frequency of the low pass filter 12. It should be noted that the blanking portion *b* of the composite video waveform A is at a so-called blacker than black intelligence level with respect to the black-gray-white distribution of the video portion *v* of the waveform A for reproduction purposes. As is of course well known during the horizontal and vertical retrace times of the scanning operation of a standard television receiver, the electron gun (or guns) of the cathode ray tube is turned off, that is, blanked, from emitting any electrons to excite the phosphor of the screen of the cathode ray tube. Thus, when the electron beam is being retraced to the next line or field of scan no visual output is provided on the screen which would be disturbing to the viewer. In the present invention any cross modulation products produced by the interaction of frequency modulated signals between the frequencies $F_o$ and $F_s$ within the frequency spectrum zero to $F_o$ are generated during the retrace period of time when the cathode ray tube of the display device utilized for reproduction is in a blanked state. That is, the video display device for reproduction cannot react to any of the cross modulation signals because when the signals are generated the cathode ray tube display device is non-responsive to any input intelligence for display. Therefore, in the present invention, the cross modulation products generated, if any, do not in any way affect adversely the reproduction of such a recorded signal.

The frequency modulated output of the FM modulator 18 is amplified in an amplifier 20 and applied to a record/playback head 22 via a record/playback switch 24. The switch 24 is shown in its record position R but may be moved to a playback position P when retrieval of the recorded video information is desired. The record/playback head 22 is schematically shown associated with a magnetic recording media, which, in the present example, is shown as a magnetic disc 26 which is rotatably driven by a motor 28. It is not intended that the recording media be limited to a magnetic disc. Various other recording media such as magnetic video recording tapes and magnetic drums may also be utilized.

The frequency modulated signals applied to the record/playback head 22 are thus recorded on the magnetic disc 26 and have frequency deviations as illustrated in curve C FIG. 2 and also FIG. 3. The magnetic recording disc 26 has a bandpass as indicated by the bracket D which extends, for example, approximately from 1 to 9 MHz. The frequency modulation signals having frequency deviations within $F_w$–$F_s$ may thus be readily recorded therein.